United States Patent
Gupta et al.

(10) Patent No.: US 9,019,976 B2
(45) Date of Patent: *Apr. 28, 2015

(54) REDUNDANT HOST CONNECTION IN A ROUTED NETWORK

(71) Applicant: Brocade Communications Systems, Inc., San Jose, CA (US)

(72) Inventors: Somesh Gupta, San Jose, CA (US); Anoop Ghanwani, Rocklin, CA (US); Phanidhar Koganti, Hyderabad (IN); Shunjia Yu, San Jose, CA (US)

(73) Assignee: Brocade Communication Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/172,683

(22) Filed: Feb. 4, 2014

(65) Prior Publication Data

US 2014/0153385 A1    Jun. 5, 2014

Related U.S. Application Data

(63) Continuation of application No. 12/725,249, filed on Mar. 16, 2010, now Pat. No. 8,665,886.

(60) Provisional application No. 61/163,752, filed on Mar. 26, 2009.

(51) Int. Cl.
*H04L 12/939* (2013.01)
*H04L 12/46* (2006.01)
(Continued)

(52) U.S. Cl.
CPC .......... *H04L 49/557* (2013.01); *H04L 12/4625* (2013.01); *H04L 45/00* (2013.01);
(Continued)

(58) Field of Classification Search
CPC ............... H04L 12/56; H04L 12/5601; H04L 2012/5619; H04L 2012/562; H04L 2012/5623; H04L 2012/5627; H04L 45/58; H04L 45/586; H04L 45/60; H04L 49/70
USPC .............. 370/351, 389, 392, 395.1, 396, 397, 370/398, 399, 395.3, 400, 401
See application file for complete search history.

(56) References Cited

U.S. PATENT DOCUMENTS 5,390,173 A   2/1995  Spinney
5,802,278 A   9/1998  Isfeld
(Continued)

FOREIGN PATENT DOCUMENTS

CN    102801599 A   11/2012
EP    1398920 A2    3/2004
(Continued)

OTHER PUBLICATIONS

Trill Working Group Internet-Draft Intended status: Proposed Standard RBridges: Base Protocol Specificaiton Mar. 3, 2010.*
(Continued)

*Primary Examiner* — Chi H Pham
*Assistant Examiner* — Weibin Huang
(74) *Attorney, Agent, or Firm* — Shun Yao; Park, Vaughan, Fleming & Dowler LLP

(57) ABSTRACT

One embodiment of the present invention provides a switch. The switch includes a management mechanism and a configuration mechanism. During operation, the management mechanism is configured to operate the switch in conjunction with the partner switch as a single logical switch. The configuration mechanism is configured to assign a virtual switch identifier to the logical switch.

23 Claims, 10 Drawing Sheets

(51) Int. Cl.
*H04L 12/701* (2013.01)
*H04L 12/753* (2013.01)
*H04L 12/713* (2013.01)
*H04L 12/721* (2013.01)
*H04L 12/703* (2013.01)
*H04L 12/931* (2013.01)

(52) U.S. Cl.
CPC ............. *H04L 45/48* (2013.01); *H04L 45/586* (2013.01); *H04L 45/66* (2013.01); *H04L 49/201* (2013.01); *H04L 49/351* (2013.01); *H04L 49/65* (2013.01); *H04L 49/70* (2013.01); *H04L 45/28* (2013.01)

(56) References Cited

U.S. PATENT DOCUMENTS

| | | |
|---|---|---|
| 5,959,968 A | 9/1999 | Chin |
| 5,973,278 A | 10/1999 | Wehrll, III |
| 5,983,278 A | 11/1999 | Chong |
| 6,041,042 A | 3/2000 | Bussiere |
| 6,085,238 A | 7/2000 | Yuasa |
| 6,104,696 A | 8/2000 | Kadambi |
| 6,185,214 B1 | 2/2001 | Schwartz |
| 6,185,241 B1 | 2/2001 | Sun |
| 6,438,106 B1 | 8/2002 | Pillar |
| 6,542,266 B1 | 4/2003 | Phillips |
| 6,633,761 B1 | 10/2003 | Singhal |
| 6,873,602 B1 | 3/2005 | Ambe |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 * | 3/2006 | Chow et al. ................... 370/392 |
| 7,097,308 B2 | 8/2006 | Kim |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,316,031 B2 | 1/2008 | Griffith |
| 7,330,897 B2 | 2/2008 | Baldwin |
| 7,380,025 B1 | 5/2008 | Riggins |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 * | 7/2009 | Kuo et al. ...................... 370/219 |
| 7,558,273 B1 | 7/2009 | Grosser |
| 7,571,447 B2 | 8/2009 | Ally |
| 7,599,901 B2 | 10/2009 | Mital |
| 7,688,960 B1 | 3/2010 | Aubuchon |
| 7,690,040 B2 | 3/2010 | Frattura |
| 7,716,370 B1 | 5/2010 | Devarapalli |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,907 B1 | 11/2010 | Abou-Emara |
| 7,860,097 B1 | 12/2010 | Lovett |
| 7,898,959 B1 | 3/2011 | Arad |
| 7,924,837 B1 | 4/2011 | Shabtay |
| 7,937,756 B2 | 5/2011 | Kay |
| 7,949,638 B1 | 5/2011 | Goodson |
| 7,957,386 B1 | 6/2011 | Aggarwal |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,102,781 B2 | 1/2012 | Smith |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,462,774 B2 | 6/2013 | Page |
| 8,465,774 B2 | 6/2013 | Breder |
| 8,520,595 B2 | 8/2013 | Yadav |
| 8,599,850 B2 | 12/2013 | Jha |
| 8,599,864 B2 | 12/2013 | Chung |
| 8,615,008 B2 | 12/2013 | Natarajan |
| 8,665,886 B2 * | 3/2014 | Gupta et al. ................... 370/401 |
| 2001/0055274 A1 | 12/2001 | Hegge |
| 2002/0021701 A1 | 2/2002 | Lavian |
| 2002/0091795 A1 | 7/2002 | Yip |
| 2003/0041085 A1 | 2/2003 | Sato |
| 2003/0123393 A1 | 7/2003 | Feuerstraeter |
| 2003/0174706 A1 | 9/2003 | Shankar |
| 2003/0189905 A1 | 10/2003 | Lee |
| 2004/0001433 A1 | 1/2004 | Gram |
| 2004/0010600 A1 | 1/2004 | Baldwin |
| 2004/0049699 A1 | 3/2004 | Griffith |
| 2004/0117508 A1 | 6/2004 | Shimizu |
| 2004/0120326 A1 | 6/2004 | Yoon |
| 2004/0165595 A1 | 8/2004 | Holmgren |
| 2004/0165596 A1 | 8/2004 | Garcia |
| 2004/0213232 A1 | 10/2004 | Regan |
| 2005/0007951 A1 | 1/2005 | Lapuh |
| 2005/0044199 A1 | 2/2005 | Shiga |
| 2005/0094568 A1 | 5/2005 | Judd |
| 2005/0094630 A1 | 5/2005 | Valdevit |
| 2005/0122979 A1 | 6/2005 | Gross |
| 2005/0157751 A1 | 7/2005 | Rabie |
| 2005/0169188 A1 | 8/2005 | Cometto |
| 2005/0195813 A1 | 9/2005 | Ambe |
| 2005/0213561 A1 | 9/2005 | Yao |
| 2005/0265356 A1 | 12/2005 | Kawarai |
| 2005/0278565 A1 | 12/2005 | Frattura |
| 2006/0018302 A1 | 1/2006 | Ivaldi |
| 2006/0034292 A1 | 2/2006 | Wakayama |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0093254 A1 | 5/2006 | Mozdy |
| 2006/0168109 A1 | 7/2006 | Warmenhoven |
| 2006/0184937 A1 | 8/2006 | Abels |
| 2006/0221960 A1 | 10/2006 | Borgione |
| 2006/0235995 A1 | 10/2006 | Bhatia |
| 2006/0242311 A1 | 10/2006 | Mai |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2007/0036178 A1 | 2/2007 | Hares |
| 2007/0086362 A1 | 4/2007 | Kato |
| 2007/0094464 A1 | 4/2007 | Sharma |

(56) References Cited

U.S. PATENT DOCUMENTS

| | | |
|---|---|---|
| 2007/0097968 A1 | 5/2007 | Du |
| 2007/0116224 A1 | 5/2007 | Burke |
| 2007/0116422 A1 | 5/2007 | Reynolds |
| 2007/0177597 A1 | 8/2007 | Ju |
| 2007/0183313 A1 | 8/2007 | Narayanan |
| 2007/0211712 A1 | 9/2007 | Fitch |
| 2007/0274234 A1 | 11/2007 | Kubota |
| 2007/0289017 A1 | 12/2007 | Copeland, III |
| 2008/0052487 A1 | 2/2008 | Akahane |
| 2008/0065760 A1 | 3/2008 | Damm |
| 2008/0080517 A1 | 4/2008 | Roy |
| 2008/0101386 A1* | 5/2008 | Gray .................. 370/401 |
| 2008/0133760 A1 | 6/2008 | Berkvens |
| 2008/0159277 A1* | 7/2008 | Vobbilisetty et al. ......... 370/357 |
| 2008/0172492 A1 | 7/2008 | Raghunath |
| 2008/0181196 A1 | 7/2008 | Regan |
| 2008/0186981 A1 | 8/2008 | Seto |
| 2008/0205377 A1 | 8/2008 | Chao |
| 2008/0219172 A1 | 9/2008 | Mohan |
| 2008/0225853 A1 | 9/2008 | Melman |
| 2008/0240129 A1 | 10/2008 | Elmeleegy |
| 2008/0267179 A1 | 10/2008 | LaVigne |
| 2008/0285555 A1 | 11/2008 | Ogasahara |
| 2008/0298248 A1 | 12/2008 | Roeck |
| 2008/0310342 A1 | 12/2008 | Kruys |
| 2009/0037607 A1 | 2/2009 | Farinacci |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138752 A1 | 5/2009 | Graham |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0245137 A1* | 10/2009 | Hares et al. .................. 370/254 |
| 2009/0245242 A1 | 10/2009 | Carlson |
| 2009/0252049 A1 | 10/2009 | Ludwig |
| 2009/0260083 A1 | 10/2009 | Szeto |
| 2009/0279558 A1 | 11/2009 | Davis |
| 2009/0292858 A1 | 11/2009 | Lambeth |
| 2009/0323708 A1 | 12/2009 | Ihle |
| 2009/0327392 A1 | 12/2009 | Tripathi |
| 2009/0327462 A1 | 12/2009 | Adams |
| 2009/0328392 | 12/2009 | Tripathi |
| 2010/0027420 A1 | 2/2010 | Smith |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0220724 A1 | 9/2010 | Rabie |
| 2010/0226381 A1 | 9/2010 | Mehta |
| 2010/0246388 A1 | 9/2010 | Gupta |
| 2010/0257263 A1 | 10/2010 | Casado |
| 2010/0271960 A1 | 10/2010 | Krygowski |
| 2010/0281106 A1 | 11/2010 | Ashwood-Smith |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2011/0019678 A1 | 1/2011 | Mehta |
| 2011/0035498 A1 | 2/2011 | Shah |
| 2011/0044339 A1* | 2/2011 | Kotalwar et al. ............... 370/392 |
| 2011/0055274 A1 | 3/2011 | Scales |
| 2011/0064086 A1 | 3/2011 | Xiong |
| 2011/0072208 A1 | 3/2011 | Gulati |
| 2011/0085560 A1 | 4/2011 | Chawla |
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van |
| 2011/0142062 A1 | 6/2011 | Wang |
| 2011/0161494 A1 | 6/2011 | McDysan |
| 2011/0161695 A1 | 6/2011 | Okita |
| 2011/0188373 A1 | 8/2011 | Saito |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0274114 A1 | 11/2011 | Dhar |
| 2011/0286457 A1 | 11/2011 | Ee |
| 2011/0296052 A1 | 12/2011 | Guo |
| 2011/0299391 A1 | 12/2011 | Vobbilisetty |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2012/0011240 A1 | 1/2012 | Hara |
| 2012/0014261 A1 | 1/2012 | Salam |
| 2012/0014387 A1 | 1/2012 | Dunbar |
| 2012/0027017 A1 | 2/2012 | Rai |
| 2012/0033663 A1 | 2/2012 | Guichard |
| 2012/0033665 A1 | 2/2012 | Jacob |
| 2012/0033669 A1 | 2/2012 | Mohandas |
| 2012/0099602 A1 | 4/2012 | Nagapudi |
| 2012/0106339 A1 | 5/2012 | Mishra |
| 2012/0131097 A1 | 5/2012 | Baykal |
| 2012/0131289 A1 | 5/2012 | Taguchi |
| 2012/0163164 A1 | 6/2012 | Terry |
| 2012/0177039 A1 | 7/2012 | Berman |
| 2012/0243539 A1 | 9/2012 | Keesara |
| 2012/0275347 A1 | 11/2012 | Banerjee |
| 2012/0294192 A1 | 11/2012 | Masood |
| 2012/0294194 A1 | 11/2012 | Balasubramanian |
| 2012/0320800 A1 | 12/2012 | Kamble |
| 2013/0028072 A1 | 1/2013 | Addanki |
| 2013/0034015 A1 | 2/2013 | Jaiswal |
| 2013/0067466 A1 | 3/2013 | Combs |
| 2013/0127848 A1 | 5/2013 | Joshi |
| 2013/0194914 A1 | 8/2013 | Agarwal |
| 2013/0250951 A1 | 9/2013 | Koganti |

(56) References Cited

U.S. PATENT DOCUMENTS

2013/0259037 A1 10/2013 Natarajan
2014/0105034 A1 4/2014 Sun

FOREIGN PATENT DOCUMENTS

EP 2001167 A1 8/2007
WO 2010111142 A1 9/2010

OTHER PUBLICATIONS

Zhai F. Hu et al. 'RBridge: Pseudo-Nickname; draft-hu-trill-pseudonode-nickname-02.txt', May 15, 2012.
Huang, Nen-Fu et al., 'An Effective Spanning Tree Algorithm for a Bridged LAN', Mar. 16, 1992.
Office Action dated Jun. 6, 2014, U.S. Appl. No. 13/669,357, filed Nov. 5, 2012.
Office Action dated Feb. 20, 2014, U.S. Appl. No. 13/598,204, filed Aug. 29, 2012.
Office Action dated May 14, 2014, U.S. Appl. No. 13/533,843, filed Jun. 26, 2012.
Office Action dated May 9, 2014, U.S. Appl. No. 13/484,072, filed May 30, 2012.
Office Action dated Feb. 28, 2014, U.S. Appl. No. 13/351,513, filed Jan. 17, 2012.
Office Action dated Jun. 18, 2014, U.S. Appl. No. 13/440,861, filed Apr. 5, 2012.
Office Action dated Mar. 6, 2014, U.S. Appl. No. 13/425,238, filed Mar. 20, 2012.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action dated Apr. 9, 2014, U.S. Appl. No. 13/092,752, filed Apr. 22, 2011.
Office Action dated Mar. 26, 2014, U.S. Appl. No. 13/092,701, filed Apr. 22, 2011.
Office Action dated Mar. 14, 2014, U.S. Appl. No. 13/092,460, filed Apr. 22, 2011.
Office Action dated Apr. 9, 2014, U.S. Appl. No. 13/092,724, filed Apr. 22, 2011.
Office Action for U.S. Appl. No. 13/425,238, filed Mar. 20, 2012, dated Mar. 6, 2014.
Office action dated Apr. 22, 2014, U.S. Appl. No. 13/030,806, filed Feb. 18, 2011.
Office Action for U.S. Appl. No. 13/092,752, filed Apr. 22, 2011, dated Apr. 9, 2014.
Office action dated Mar. 27, 2014, U.S. Appl. No. 13/098,490, filed May 2, 2011.
Office Action for U.S. Appl. No. 13/598,204, filed Aug. 29, 2012, dated Feb. 20, 2014.
Office action dated Aug. 29, 2014, U.S. Appl. No. 13/042,259, filed Mar. 7, 2011.
Office action dated Jan. 16, 2014, U.S. Appl. No. 13/042,259, filed Mar. 7, 2011.
Office action dated Dec. 2, 2013, U.S. Appl. No. 13/184,526, filed Jul. 16, 2011.
Office action dated Nov. 29, 2013, U.S. Appl. No. 13/092,873, filed Apr. 22, 2011.
Office action dated Nov. 12, 2013, U.S. Appl. No. 13/312,903, filed Dec. 6, 2011.
Office Action for U.S. Appl. No. 13/533,843, filed Jun. 26, 2012, dated Oct. 21, 2013.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004, pp. 124-131, XP001198207, ISSN: 0163-6804, DOI: 10.1109/MCOM.2004.1304248.
Office Action for U.S. Appl. No. 13/365,808, filed Jul. 18, 2013, dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 13/092,873, filed Apr. 22, 2011, dated Jun. 19, 2013.
Office Action for U.S. Appl. No. 13/184,526, filed Jul. 16, 2011, dated May 22, 2013.
Office Action for U.S. Appl. No. 13/184,526, filed Jul. 16, 2011, dated Jan. 28, 2013.
Office Action for U.S. Appl. No. 13/050,102, filed Mar. 17, 2011, dated May 16, 2013.
Office Action for U.S. Appl. No. 13/050,102, filed Mar. 17, 2011, dated Oct. 26, 2012.
Office Action for U.S. Appl. No. 13/030,688, filed Feb. 18, 2011, dated Apr. 25, 2013.
U.S. Appl. No. 13/030,806 Office Action dated Dec. 3, 2012.
Office Action for U.S. Appl. No. 13/030,806, filed Feb. 18, 2011, dated Jun. 11, 2013.
Office Action for U.S. Appl. No. 13/098,360, filed Apr. 29, 2011, dated May 31, 2013.
Office Action for U.S. Appl. No. 13/092,864, filed Apr. 22, 2011, dated Sep. 19, 2012.
Office Action for U.S. Appl. No. 12/950,968, filed Nov. 19, 2010, dated Jun. 7, 2012.
Office Action for U.S. Appl. No. 12/950,968, filed Nov. 19, 2010, dated Jan. 4, 2013.
Office Action for U.S. Appl. No. 13/092,877, filed Apr. 22, 2011, dated Mar. 4, 2013.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/092,752, filed Apr. 22, 2011, dated Feb. 5, 2013.
Office Action for U.S. Appl. No. 13/092,752, filed Apr. 22, 2011, from Park, Jung H., dated Jul. 18, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,460, filed Apr. 22, 2011, dated Jun. 21, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/092,580, filed Apr. 22, 2011, dated Jun. 10, 2013.
Office Action for U.S. Appl. No. 13/092,724, filed Apr. 22, 2011, dated Jul. 16, 2013.
Office Action for U.S. Appl. No. 13/092,724, filed Apr. 22, 2011, dated Feb. 5, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/087,239, filed Apr. 14, 2011, dated May 22, 2013.
Office action dated Jul. 31, 2013, U.S. Appl. No. 13/042,259, filed Mar. 7, 2011.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Brocade Brocade Unveils The Effortless Network, http://newsroom.brocade.com/press-releases/brocade-unveils-the-effortless-network-nasdaq-brcd-0859535, 2012.
Foundary Fastlron Configuration Guide, Software Release FSX 04.2.00b, Software Release FWS 04.3.00, Software Release FGS 05.0.00a, Sep. 2008.
Brocade, 'Fastlron and Turbolron 24x Configuration Guide', Feb. 16, 2010.
Fastlron Configuration Guide Supporting Ironware Software Release 07.0.00, Dec. 18, 2009.

(56) References Cited

OTHER PUBLICATIONS

Brocade, 'The Effortless Network: Hyperedge Technology for the Campus LAN' 2012.
Narten, T. et al., 'Problem Statement: Overlays for Network Virtualization draft-narten-n.vo3-over l ay-problem-statement-01', Oct. 31, 2011.
'An Introduction to Brocade VCS Fabric Technology', Brocade white paper, http://community.brocade.com/docs/DOC-2954, Dec. 3, 2012.
Kreeger, L. et al., 'Network Virtualization Overlay Control Protocol Requirements draft-kreeger-nvo3-overlay-cp-00', Jan. 30, 2012.
Knight, 'Network Based IP VPN Architecture using Virtual Routers', May 2003.
Louati, Wajdi et al., 'Network-based virtual personal overlay networks using programmable virtual routers', IEEE Communications Magazine, Jul. 2005.
Office Action for U.S. Appl. No. 13/092,877, filed Apr. 22, 2011, dated Sep. 5, 2013.
Office Action for U.S. Appl. No. 13/044,326, filed Mar. 9, 2011, dated Oct. 2, 2013.
Switched Virtual Networks. 'Internetworking Moves Beyond Bridges and Routers' Data Communications, McGraw Hill. New York, US, vol. 23, No. 12, Sep. 1, 1994, pp. 66-70,72,74, XP000462385 ISSN: 0363-6399.
Knight S et al: 'Virtual Router Redundancy Protocol' Internet Citation Apr. 1, 1998, XP002135272 Retrieved from the Internet: URL:ftp://ftp.isi.edu/in-notes/rfc2338.txt [retrieved on Apr. 10, 2000].
Eastlake, D. et al., 'RBridges: TRILL Header Options', Dec. 24, 2009, pp. 1-17, TRILL Working Group.
Touch, J. et al., 'Transparent Interconnection of Lots of Links (TRILL): Problem and Applicability Statement', May 2009, Network Working Group, pp. 1-17.
Perlman, Radia et al., 'RBridge VLAN Mapping', TRILL Working Group, Dec. 4, 2009, pp. 1-12.
Brocade, 'Brocade Fabrics OS (FOS) 6.2 Virtual Fabrics Feature Frequently Asked Questions', pp. 1-6, 2009 Brocade Communications Systems, Inc.
Perlman, Radia et al., 'Challenges and Opportunities in the Design of TRILL: a Routed layer 2 Technology', 2009.
S. Nadas et al., 'Virtual Router Redundancy Protocol (VRRP) Version 3 for IPv4 and IPv6', Internet Engineering Task Force, Mar. 2010.
Perlman, Radia et al., 'RBridges: Base Protocol Specification; Draft-ietf-trill-rbridge-protocol-16.txt', Mar. 3, 2010, pp. 1-117.
Christensen, M. et al., 'Considerations for Internet Group Management Protocol (IGMP) and Multicast Listener Discovery (MLD) Snooping Switches', May 2006.
Lapuh, Roger et al., 'Split Multi-Link Trunking (SMLT)', Network Working Group, Oct. 2012.
Lapuh, Roger et al., 'Split Multi-link Trunking (SMLT)', draft-lapuh-network-smlt-08', Jul. 2008.
'RBridges: Base Protocol Specification', IETF Draft, Perlman et al., Jun. 26, 2009.
Office action dated Jan. 10, 2014, U.S. Appl. No. 13/092,580, filed Apr. 22, 2011.
Office Action for U.S. Appl. No. 13/092,887, dated Jan. 6, 2014.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009, pp. 1-6, XP002649647, DOI: 10.1109/Globecom.2009.5360776 ISBN: 1-4244-5626-0 [retrieved on Jul. 19, 2011].
Office action dated Jun. 11, 2013, U.S. Appl. No. 13/044,301, filed Mar. 9, 2011.
Office action dated Feb. 22, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office action dated Jun. 13, 2013, U.S. Appl. No. 13/312,903, filed Dec. 6, 2011.
Office action dated Jan. 6, 2014, U.S. Appl. No. 13/092,877, filed Apr. 22, 2011.
Office Action for U.S. Appl. No. 13/042,259, filed Mar. 7, 2011, from Jaroenchonwanit, Bunjob, dated Jan. 16, 2014.
Lapuh, Roger et al., 'Split Multi-link Trunking (SMLT) draft-lapuh-network-smlt-08', Jan. 2009.
Office Action for U.S. Appl. No. 13/351,513, filed Jan. 17, 2012, dated Feb. 28, 2014.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated Aug. 21, 2014, U.S. Appl. No. 13/184,526, filed Jul. 16, 2011.
Office action dated Aug. 4, 2014, U.S. Appl. No. 13/050,102, filed Mar. 17, 2011.
Office Action for U.S. Appl. No. 13/030,806, filed Feb. 18, 2011, dated Dec. 3, 2012.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/098,490, filed May 2, 2011, dated Mar. 27, 2014.
Office Action for 13/742,207, filed Jan. 15, 2013.
Office Action for U.S. Appl. No. 13/351,513, filed Jan. 17, 2012, dated Jul. 24, 2014.
Office Action for U.S. Appl. No. 13/087,239, filed Apr. 14, 2011, dated Dec. 5, 2012.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/556,061, filed Jul. 23, 2012, dated Jun. 6, 2014.
Office Action for U.S. Appl. No. 13/092,877, filed Apr. 22, 2011, dated Jun. 20, 2014.
Office Action for U.S. Appl. No. 13/092,873, filed Apr. 22, 2011, dated Jul. 25, 2014.
Office Action for U.S. Appl. No. 13/312,903, filed Dec. 6, 2011, dated Aug. 7, 2014.
Brocade 'An Introduction to Brocade VCS Fabric Technology', Dec. 3, 2012.
Office action dated Sep. 12, 2012, U.S. Appl. No. 12/725,249, filed Mar. 16, 2010.
Office action dated Apr. 26, 2012, U.S. Appl. No. 12/725,249, filed Mar. 16, 2010.
Office action dated Dec. 5, 2012, U.S. Appl. No. 13/087,239, filed Apr. 14, 2011.
Office action dated May 22, 2013, U.S. Appl. No. 13/087,239, filed Apr. 14, 2011.
Office action dated Dec. 21, 2012, U.S. Appl. No. 13/098,490, filed May 2, 2011.
Office action dated Jul. 9, 2013, U.S. Appl. No. 13/098,490, filed May 2, 2011.
Office action dated Feb. 5, 2013, U.S. Appl. No. 13/092,724, filed Apr. 22, 2011.
Office action dated Jun. 10, 2013, U.S. Appl. No. 13/092,580, filed Apr. 22, 2011.
Office action dated Mar. 18, 2013, U.S. Appl. No. 13/042,259, filed Mar. 7, 2011.

(56) References Cited

OTHER PUBLICATIONS

Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office Action for U.S. Appl. No. 13/950,974, filed Nov. 19, 2010, from Haile, Awet A., dated Dec. 2, 2012.
Office action dated May 24, 2012, U.S. Appl. No. 12/950,974, filed Nov. 19, 2010.
Office action dated Mar. 4, 2013, U.S. Appl. No. 13/092,877, filed Apr. 22, 2011.
Office action dated Sep. 5, 2013, U.S. Appl. No. 13/092,877, filed Apr. 22, 2011.
Office action dated Jun. 7, 2012, U.S. Appl. No. 12/950,968, filed Nov. 19, 2010.
Office action dated Jan. 4, 2013, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.
Office action dated Dec. 3, 2012, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.

\* cited by examiner

REDUNDANT HOST CONNECTION IN A ROUTED NETWORK

RELATED APPLICATIONS

This application is a continuation of U.S. application Ser. No. 12/725,249, entitled "REDUNDANT HOST CONNECTION IN A ROUTED NETWORK," by inventors Somesh Gupta, Anoop Ghanwani, Phanidhar Koganti, and Shunjia Yu, filed 16 Mar. 2010, which claims the benefit of U.S. Provisional Application No. 61/163,752, entitled "Using TRILL for Redundant Connections to Hosts," by inventors Somesh Gupta and Anoop Ghanwani, filed 26 Mar. 2009, which is incorporated by reference herein.

BACKGROUND

1. Field

The present disclosure relates to network management. More specifically, the present disclosure relates to a method and system for facilitating link aggregation from one network device to multiple devices in a routed network.

2. Related Art

As more mission-critical applications are being implemented in data communication networks, high-availability operation is becoming progressively more important as a value proposition for network architects. It is often desirable to divide a conventional aggregated link (from one device to another) among multiple network devices, such that a node failure or link failure would not affect the operation of the multi-homed device.

Meanwhile, layer-2 (e.g., Ethernet) networking technologies continue to evolve. More routing-like functionalities, which have traditionally been the characteristics of layer-3 (e.g., IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

While TRILL brings many desirable features to layer-2 networks, some issues remain unsolved when TRILL-capable devices are coupled with non-TRILL devices. Particularly, when a non-TRILL device is coupled to multiple TRILL devices using link aggregation, existing technologies do not provide a scalable and flexible solution that takes full advantage of the TRILL network.

SUMMARY

One embodiment of the present invention provides a switch. The switch includes a management mechanism and a configuration mechanism. During operation, the management mechanism is configured to operate the switch in conjunction with the partner switch as a single logical switch. The configuration mechanism is configured to assign a virtual switch identifier to the logical switch.

In a variation on this embodiment, the switch is a layer-2 switch capable of routing without requiring the network topology to be based on a spanning tree.

In a variation on this embodiment, the switch is a routing bridge configured to operate in accordance with the TRILL protocol.

In a variation on this embodiment, the configuration mechanism is further configured to set the cost of a link to the logical switch to be zero.

In a variation on this embodiment, the switch includes a frame-marking mechanism configured to mark an ingress-switch field of a frame with the virtual switch identifier, wherein the frame is received from a device coupled to the switch.

In a variation on this embodiment, the switch includes a communication mechanism configured to notify the partner switch about the reachability of a media access control (MAC) address associated with a device coupled to both the switch and the partner switch.

In a further variation, upon detecting a failure of a link between the device and the partner switch, the configuration mechanism is configured to disassociate the device from the virtual switch.

In a further variation, upon detecting a failure of a link between the device and the switch, the communication mechanism is configured to notify the partner node of the failure via an inter-switch communication channel.

In a variation on this embodiment, the switch includes a communication mechanism configured to advertise that the virtual switch is equivalent to both the switch and the partner switch, thereby facilitating multi-path routing to or from a device coupled to both switches.

In a variation on this embodiment, the switch discards a received multicast frame corresponding to a multicast group to which a device coupled to both the switch and the separate physical switch belongs, when the frame's ingress switch identifier is the same as the virtual switch identifier, or when the frame's ingress switch identifier is different from the virtual switch identifier and a link between the device and the switch is not a primary link.

In a variation on this embodiment, the switch forwards a multicast frame originated from a first local device coupled to the switch to a second local device coupled to both the switch and the separate physical switch, when the second local device is in a multicast group corresponding to the multicast frame.

DETAILED DESCRIPTION

Figure 1:
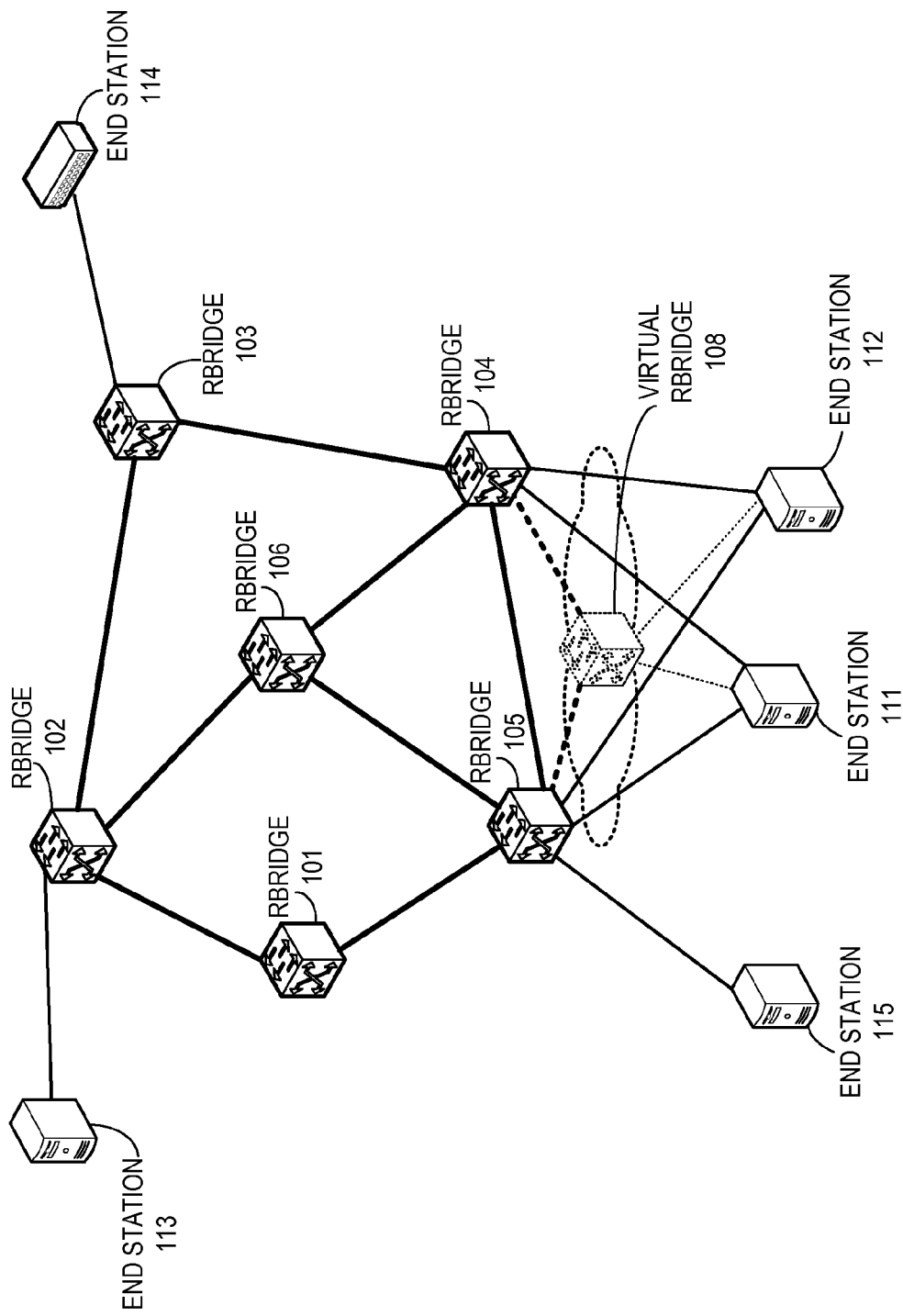
FIG. 1 illustrates an exemplary network where a virtual RBridge identifier is assigned to two physical TRILL RBridges which are coupled to a non-TRILL device via a divided aggregate link, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of providing a scalable and flexible way of provisioning multi-device link aggregation is solved by forming a logical, virtual switch and assigning a virtual switch identifier to the multiple switches which share the aggregate link. For example, in a TRILL network, when an end station is coupled to two separate RBridges and the links to these RBridges form an aggregate link, a virtual TRILL RBridge identifier (ID) is generated, and the end station is considered to be logically coupled to the virtual RBridge. An incoming frame from the end-station is marked with a virtual RBridge nickname as its ingress RBridge nickname and routed through the rest of the TRILL network. Other end stations which are coupled to the same physical TRILL RBridges in a similar way can use the same virtual RBridge nickname as their ingress RBridge nickname. To the rest of the TRILL network, such a dual-homed end station appears to be coupled directly to the virtual RBridge. The use of such a virtual RBridge nickname allows multiple dual-homed end stations to share the same virtual RBridge, which is a scalable solution as the number of dual-homed end stations grows. When one of the aggregated links fails, the affected end station is no longer considered coupled to the virtual RBridge. Instead, the end station would be considered to be coupled to the physical RBridge with an operational link. This configuration allows fast protection switching and timely topology convergence.

Although the present disclosure is presented using examples based on the TRILL protocol, embodiments of the present invention are not limited to TRILL networks, or networks defined in a particular Open System Interconnection Reference Model (OSI reference model) layer.

The term "RBridge" refers to routing bridges, which are bridges implementing the TRILL protocol as described in IETF draft "RBridges: Base Protocol Specification," available at http://tools.ietf.org/html/draft-ietf-trill-rbridge-protocol-16, which is incorporated by reference herein. Embodiments of the present invention are not limited to the application among RBridges. Other types of switches, routers, and forwarders can also be used.

The term "end station" refers to a network device that is not TRILL-capable. "End station" is a relative term with respect to the TRILL network. However, "end station" does not necessarily mean that the network device is an end host. An end station can be a host, a conventional layer-2 switch, an IP router, or any other type of network device. Additionally, an end station can be coupled to other switches, routers, or hosts further away from the TRILL network. In other words, an end station can be an aggregation point for a number of network devices to enter the TRILL network.

The term "dual-homed end station" refers to an end station that has an aggregate link to two or more TRILL RBridges, where the aggregate link includes multiple physical links to the different RBridges. The aggregate link, which includes multiple physical links, functions as one logical link to the end station. Although the term "dual" is used here, the term "dual-homed end station" does not limit the number of physical RBridges sharing the aggregate link to two. In various embodiments, other numbers of physical RBridges can share the same aggregate link. Where "dual-homed end station" is used in the present disclosure, the term "multi-homed end station" can also be used.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "RBridge identifier" refers to a group of bits that can be used to identify an RBridge. Note that the TRILL standard uses "RBridge ID" to denote a 48-bit intermediate-system-to-intermediate-system (IS-IS) System ID assigned to an RBridge, and "RBridge nickname" to denote a 16-bit value that serves as an abbreviations for the "RBridge ID." In this disclosure, "RBridge identifier" is used as a generic term and is not limited to any bit format, and can refer to "RBridge ID" or "RBridge nickname" or any other format that can identify an RBridge.

Network Architecture

FIG. 1 illustrates an exemplary network where a virtual TRILL identifier is assigned to two physical TRILL RBridges which are coupled to a non-TRILL device via a divided aggregate link, in accordance with an embodiment of the present invention. As illustrated in FIG. 1, a TRILL network includes six RBridges, 101, 102, 103, 104, 105, and 106. End station 113 is coupled to RBridge 102; end station 114 is coupled to RBridge 103; and end station 115 is coupled to RBridge 105. End stations 111 and 112 are both dual-homed and coupled to RBridges 104 and 105. The goal is to allow a dual-homed end station to use both physical links to two separate TRILL RBridges as a single, logical aggregate link, with the same media access control (MAC) address. Such a configuration would achieve true redundancy and facilitate fast protection switching.

However, in a conventional TRILL network, the dual-home-style connectivity would not provide the desired result, because the TRILL protocol depends on MAC address learning to determine the location of end stations (i.e., to which ingress RBridge an end station is coupled) based on a frame's ingress TRILL RBridge ID. As such, an end station can only appear to be reachable via a single physical RBridge. For example, assume that end station 112 is in communication with end station 113. The ingress RBridge would be RBridges 105 and 104, and the egress RBridge would be RBridge 102. The incoming frames from end station 112 would have either RBridge 104 or RBridge 105 marked as their ingress RBridge ID. When RBridge 102 receives these frames and performs MAC address learning, RBridge 102 would assume that end station 112 is moving and is either coupled to RBridge 104 or RBridge 105 (but not both). RBridge 102 would send the frames from end station 113 to either RBridge 104 or RBridge 105. Consequently, only one of the physical links leading to end station 112 is used, which defeats the purpose of having redundant links between end station 112 and RBridges 104 and 105.

In embodiments of the present invention, as illustrated in FIG. 1, RBridges 104 and 105 are configured to operate in a special "trunked" mode for end stations 111 and 112. End stations 111 and 112 view RBridges 104 and 105 as a common virtual RBridge 108, with a corresponding virtual RBridge ID. Dual-homed end stations 111 and 112 are considered to be logically coupled to virtual RBridge 108 via logical links represented by dotted lines. Virtual RBridge 108 is considered to be logically coupled to both RBridges 104 and 105, optionally with zero-cost links (also represented by dotted lines). Incoming frames from end station 111 or 112 are marked with virtual RBridge 108's nickname as their ingress RBridge nickname. As a result, other RBridges in the TRILL network can learn that end stations 111 and 112 are both reachable via virtual RBridge 108. Furthermore, RBridges 104 and 105 can advertise their respective connectivity (optionally via zero-cost links) to virtual RBridge 108. Hence, multi-pathing can be achieved when other RBridges choose to send frames to virtual RBridge 108 (which is marked as the egress RBridge in the frames) via RBridges 104 and 105. In the following description, RBridges which participate in link aggregation and form a virtual RBridge are referred to as "partner RBridges."

Since the two partner RBridges function as a single logical RBridge, the MAC address reachability learned by each RBridge is shared with the other partner RBridge. For example, during normal operation, end station 111 may choose to send its outgoing frames only via the link to RBridge 105. As a result, only RBridge 105 would learn end station 111's MAC address (and the corresponding port on RBridge 105 to which end station 111 is coupled). This information is then shared by RBridge 105 with RBridge 104. Since the frames coming from end station 111 would have virtual RBridge 108's nickname as their ingress RBridge nickname, when other devices in the network send frames back to end station 111, these frames would have virtual RBridge 108's nickname as their egress RBridge nickname, and these frames might be sent to either RBridge 104 or 105. When RBridge 104 receives such a frame, it can determine that this frame should be sent to its partner RBridge 105, based on the MAC reachability information shared by RBridge 105.

It should be noted that virtual RBridge 108 is not specific to a particular set of aggregate links. In other words, both dual-homed end stations 111 and 112 can share the same virtual RBridge 108. This feature makes the present solution scalable, because a number of dual-homed end stations can be logically attached to the same virtual RBridge.

In addition, an end station is not required to change the way it is configured for link aggregation. A dual-homed end station only needs to be configured to have an aggregate link to the virtual RBridge, as would be the case with a conventional, physical RBridge, using an existing link aggregation method. Hence, the dual-homed end station does not need to be aware that the virtual RBridge on the other end of the aggregate link is actually two physical RBridges. Furthermore, the rest of the TRILL network (apart from RBridges 104 and 105) is also not required to be aware that virtual RBridge 108 is actually not a physical RBridge. That is, to the rest of the TRILL network, virtual RBridge 108 is indistinguishable from any of the physical RBridges. Therefore, the present invention does not require extra configuration to the rest of the TRILL network.

Frame Processing

Figure 2:
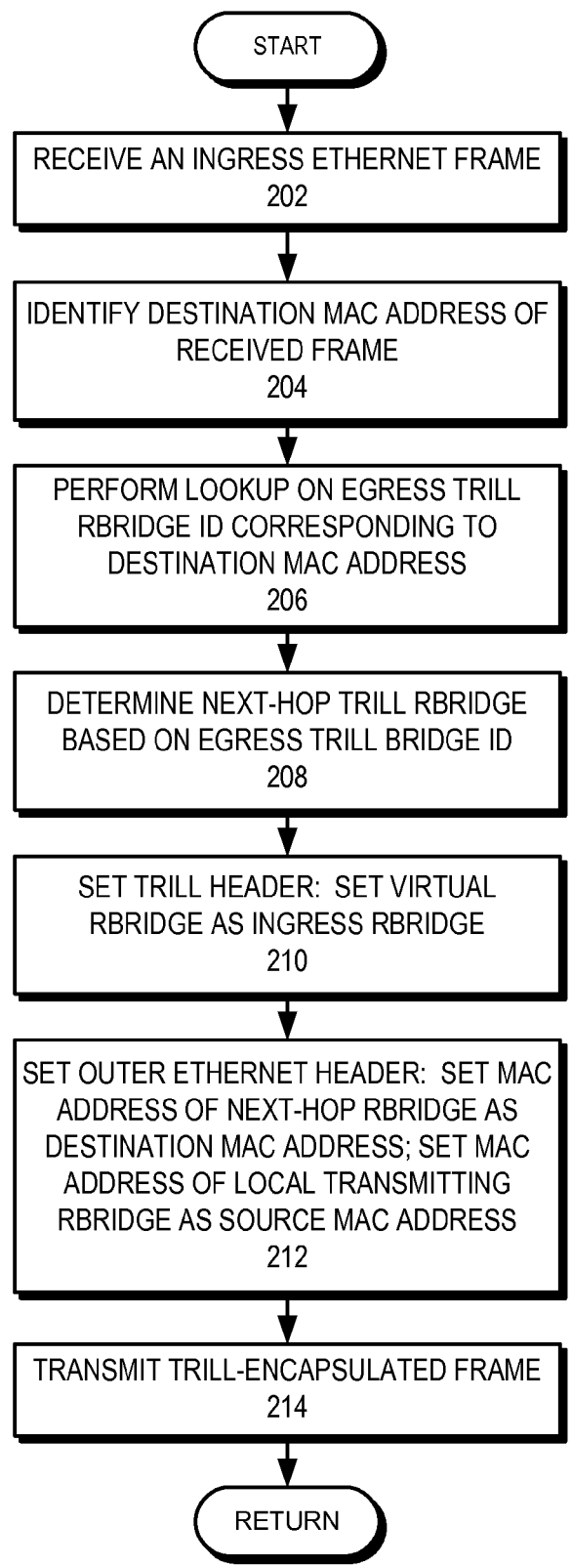
FIG. 2 presents a flowchart illustrating the process of configuring the TRILL header of an ingress frame from a dual-homed end station at an ingress physical RBridge, in accordance with an embodiment of the present invention.

FIG. 2 presents a flowchart illustrating the process of configuring the TRILL header of an ingress frame from a dual-homed end station at an ingress physical RBridge, in accordance with an embodiment of the present invention. During operation, an RBridge participating in link aggregation receives an ingress Ethernet frame from an end station (operation 202). The RBridge then identifies the destination MAC address of the received frame (operation 204). Based on the destination MAC address, the RBridge performs a lookup on the egress TRILL RBridge nickname (operation 206). Next, the RBridge determines the next-hop TRILL RBridge based on the egress TRILL RBridge nickname (operation 208). (It is assumed that the routing function in the TRILL protocol or other routing protocol is responsible for populating the forwarding information base at each RBridge.)

Subsequently, the RBridge sets the TRILL header of the frame (operation 210). In doing so, the RBridge sets the virtual RBridge as the ingress RBridge for the frame. The egress RBridge of the TRILL header is set based on the result of operation 206.

The RBridge then sets the outer Ethernet header of the frame (operation 212). In doing so, the RBridge sets the MAC address of the next-hop RBridge (the result of operation 208) as the destination MAC address in the outer Ethernet header. The RBridge further sets the MAC address of the local transmitting RBridge as the source MAC address in the outer Ethernet header. After setting the outer Ethernet header, the RBridge transmits the TRILL-encapsulated frame to the next-hop RBridge (operation 214).

Figure 3A:
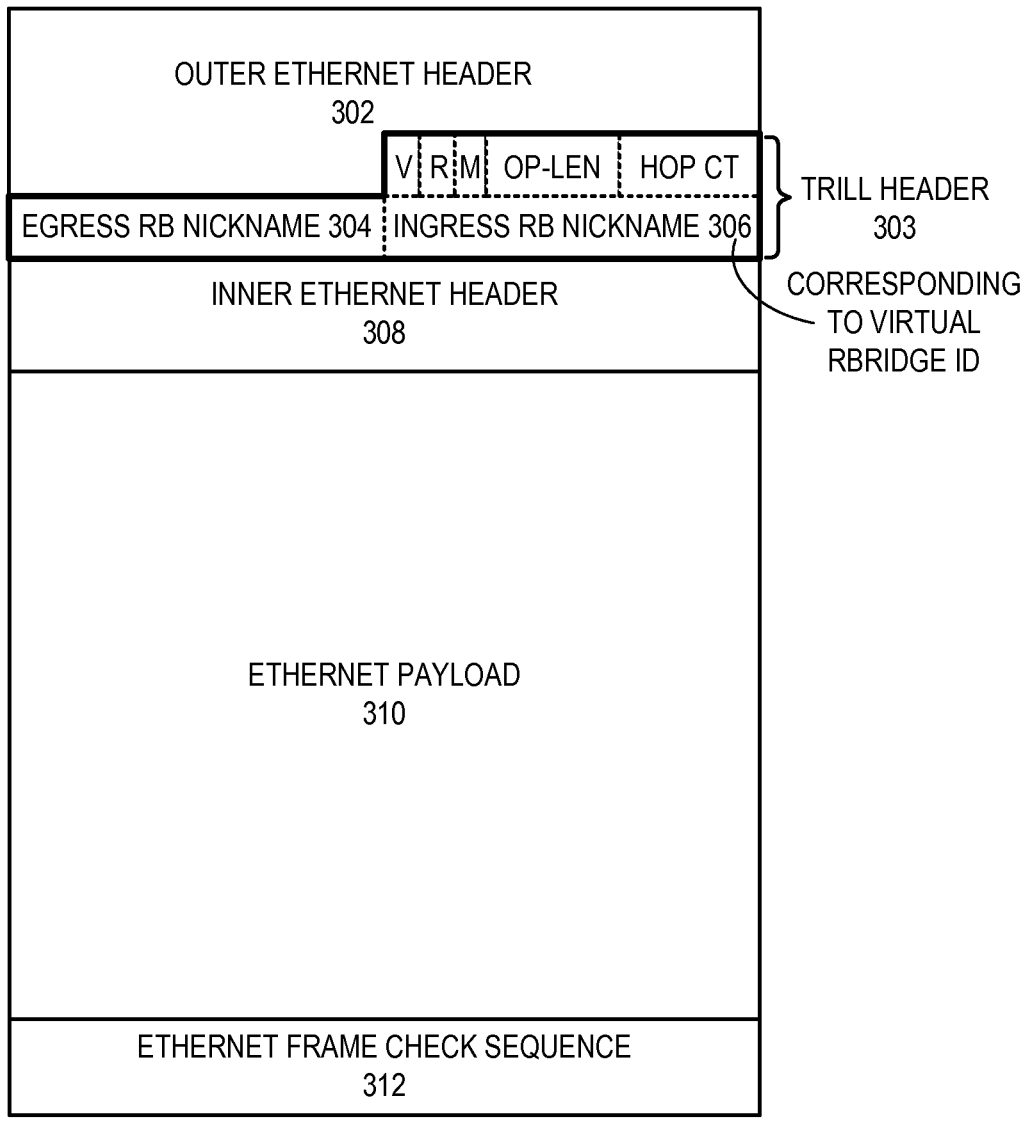
FIG. 3A illustrates an exemplary header configuration of an ingress TRILL frame which contains a virtual RBridge nickname in its ingress RBridge nickname field, in accordance with an embodiment of the present invention.

FIG. 3A illustrates an exemplary header configuration of an ingress TRILL frame which contains a virtual RBridge nickname in its ingress RBridge nickname field, in accordance with an embodiment of the present invention. In this example, a TRILL-encapsulated frame includes an outer Ethernet header 302, a TRILL header 303, an inner Ethernet header 308, an Ethernet payload 310, and an Ethernet frame check sequence (FCS) 312.

TRILL header 303 includes a version field (denoted as "V"), a reserved field (denoted as "R"), a multi-destination indication field (denoted as "M"), an option-field-length indication field (denoted as "OP-LEN"), and a hop-count field (denoted as "HOP CT"). Also included are an egress RBridge nickname field 304 and an ingress RBridge nickname field 306.

In some embodiments, in addition to carrying the virtual RBridge's nickname in the ingress RBridge nickname field, it is possible to include the physical ingress RBridge nickname in the TRILL option field. This configuration can facilitate end-to-end congestion notification and help with multicast pruning scenarios.

Furthermore, it is also possible to carry virtual RBridge identifier in the TRILL option field, instead of the source RBridge nickname field. The ingress RBridge nickname field of an incoming frame is used to carry the nickname of the physical ingress RBridge (which is one of the partner RBridges forming the virtual RBridge). This configuration allows other RBridges in the TRILL network to identify the actual, physical ingress RBridge as well as the virtual ingress RBridge.

Figure 3B:
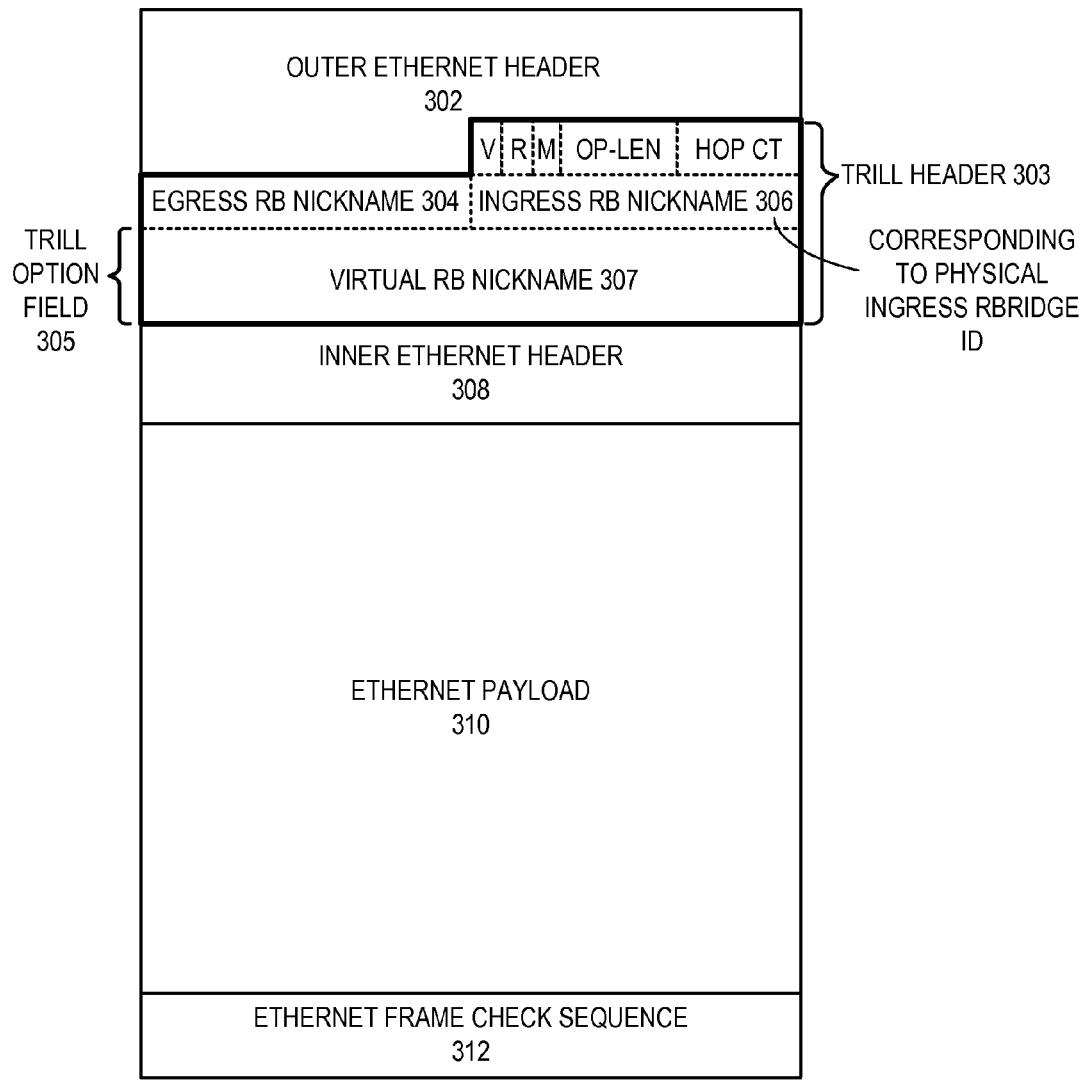
FIG. 3B illustrates an exemplary header configuration of an ingress TRILL frame which contains a virtual RBridge nickname in its TRILL option field, in accordance with an embodiment of the present invention.

FIG. 3B illustrates an exemplary header configuration of an ingress TRILL frame which contains a virtual RBridge nickname in its TRILL option field, in accordance with an embodiment of the present invention. In this example, the frame's option-field-length field "OP-LEN" indicates the length of its TRILL option field 305. TRILL option field 305 includes the virtual RBridge nickname 307. The ingress RBridge nickname field 306 carries the nickname of the physical ingress RBridge. To properly identify the RBridge nickname, an egress RBridge in the TRILL network is assumed to be capable of recognizing the TRILL option field 305. Note that the top two bits of the first octet of the options area are a Critical Hop by Hop (CHbH) bit and a Critical Ingress to Engress (CItE) bit. The CHbH bit can be set to zero, and the CItE bit can be set to one. This way, only the ingress and egress RBridges are required to parse the option field whereas a transit RBridge only needs to forward the frames transparently. It is also possible to set the CHbH bit to one to require the transit RBridges to parse the option field. This configuration allows the RBridges in the TRILL network to make more intelligent routing decisions.

In one embodiment, when processing a received frame, an egress physical RBridge determines whether the Ethertype field of the frame's inner Ethernet header indicates that the return dataflow should go to the same physical ingress RBridge to facilitate stateful operation at the end stations. In other words, for certain types of data flows (such as Fibre Channel over Ethernet, FCoE), it is desirable that the return data path traverses the same ingress physical RBridge. For example, referring back to FIG. 1, suppose end station 112 generates FCoE traffic to end station 114. The ingress frames from end station 112 are sent to RBridge 104. RBridge 104 encodes virtual RBridge 108's nickname in the TRILL option field and RBridge 104's nickname in the ingress RBridge nickname field of these frames before sending them to RBridge 103, which is the egress RBridge. When parsing these frames, RBridge 103 determines that their Ethertype field indicates that these frames are for FCoE traffic. As a result, RBridge 103 maintains the knowledge that for FCoE traffic between the MAC address pair (i.e., the MAC addresses of end stations 112 and 114), frames from end station 114 to end station 112 should have RBridge 104's nickname (instead of virtual RBridge 108's nickname) as their egress RBridge nickname. This configuration ensures that the FCoE traffic from end station 114 to end station 112 always goes through RBridge 104 and the same port on end station 112.

Figure 4:
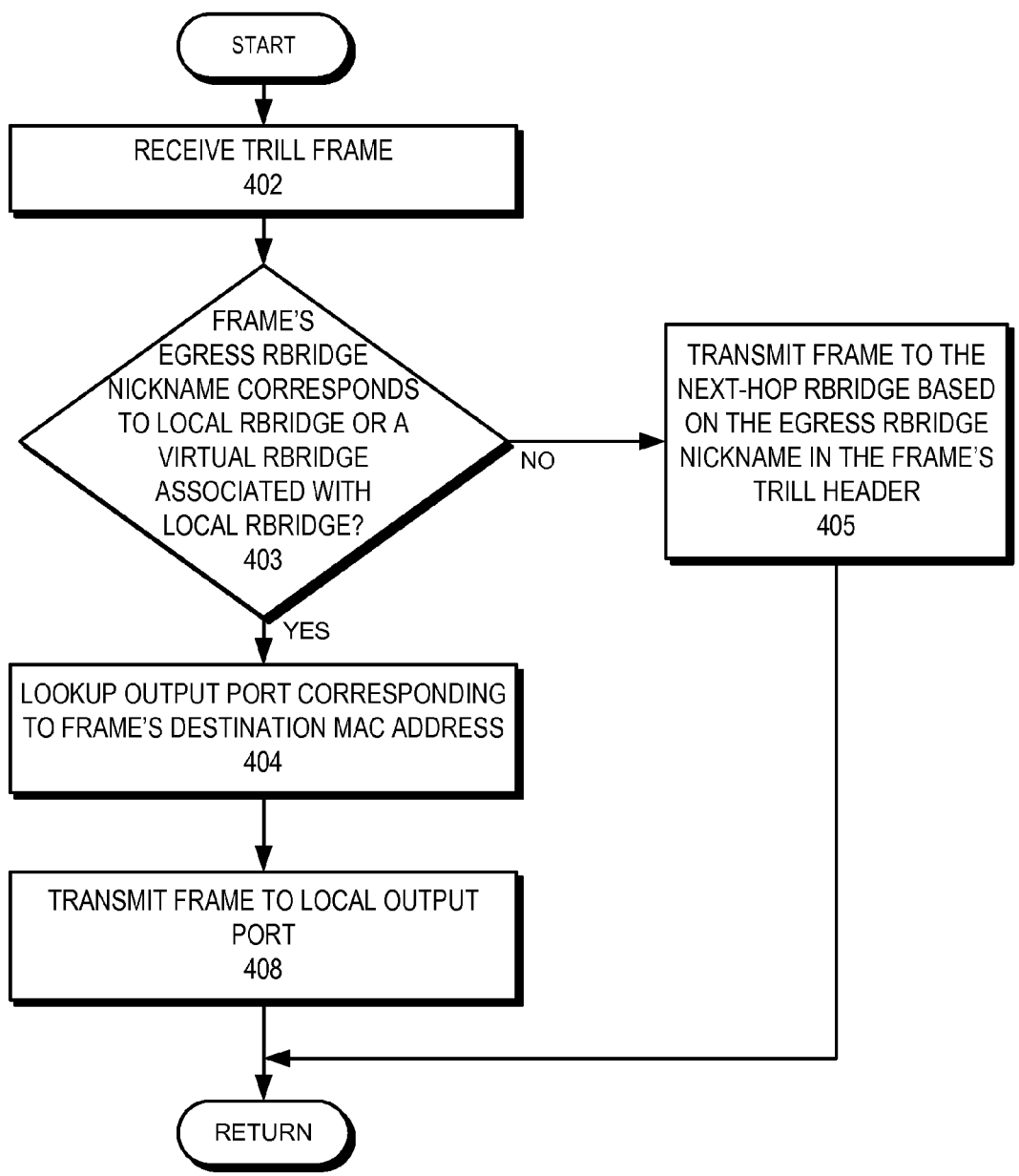
FIG. 4 presents a flowchart illustrating the process of forwarding a unicast TRILL frame at a partner RBridge which participates in link aggregation, in accordance with an embodiment of the present invention.

After a partner RBridge encapsulates an ingress frame with the proper TRILL and outer Ethernet headers and transmits the frame to its destination, it is expected to receive frames in the reverse direction from the destination in response to the transmission. FIG. 4 presents a flowchart illustrating the process of receiving and forwarding a unicast TRILL frame at a partner RBridge which participates in link aggregation, in accordance with an embodiment of the present invention.

During operation, a partner RBridge receives a TRILL frame (operation 402). The RBridge then determines whether the frame's egress RBridge nickname corresponds to the local RBridge or a virtual RBridge associated with the local RBridge (operation 403). If the frame's egress RBridge nickname matches neither the local RBridge nor a virtual RBridge associated with the local RBridge (i.e., the frame is not destined to the local RBridge), the RBridge transmits the frame to the next-hop RBridge based on the frame's egress RBridge nickname (operation 405).

On the other hand, if the condition in operation 403 is met, the RBridge then performs a lookup in its MAC-address table to identify an output port corresponding to the frame's destination MAC address in its inner Ethernet header (operation 404). Note that the MAC reachability information is shared between the two partner RBridges forming the virtual RBridge. Hence, even if the RBridge has not received an ingress frame with the same source MAC address (i.e., the RBridge has not learned the MAC address locally), the RBridge can still determine that the destination MAC address is reachable via a local link based on the MAC reachability information shared from the partner RBridge. Subsequently, the RBridge transmits the frame to the local output port corresponding to the frame's destination MAC address in its inner Ethernet header (operation 408).

Multicast

In the case of multicast, the frame's egress RBridge nickname field carries the nickname of the root RBridge for the multicast tree and the multicast frame can typically reach all the RBridges in the TRILL network. Special procedures can be implemented to minimize traffic duplication with dual-homed end stations.

Figure 5A:
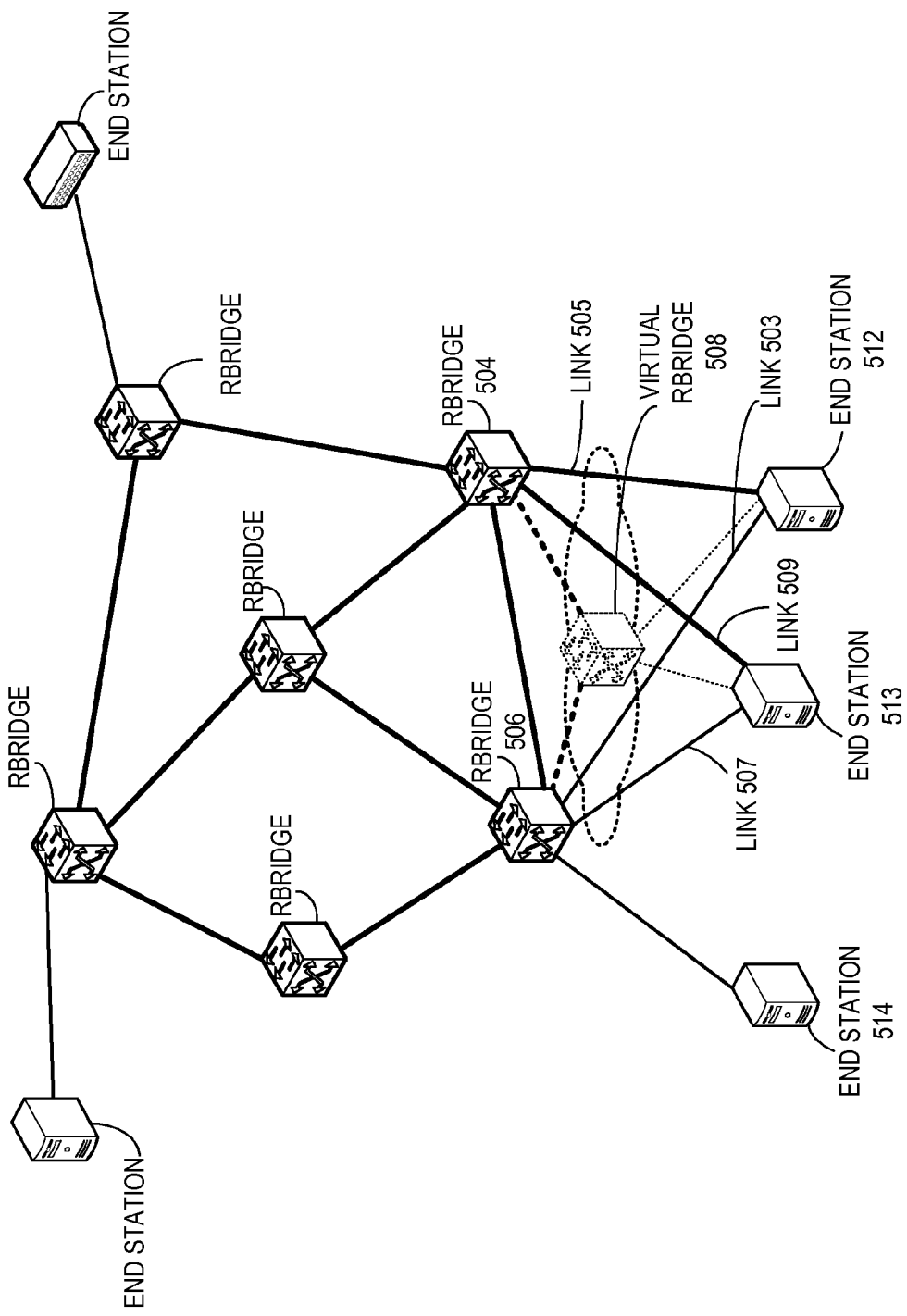
FIG. 5A presents an example illustrating how multicast can be handled among dual-homed end stations, in accordance with one embodiment of the present invention.

FIG. 5A presents an example illustrating how multicast can be handled among dual-homed end stations, in accordance with one embodiment of the present invention. In this example, an end station 513 is dual-homed with RBridges 506 and 504, via links 507 and 509, respectively. An end station 512 is dual-homed with RBridges 506 and 504, via links 503 and 505, respectively. Links 507 and 509 form a link trunk for end station 513, and links 503 and 505 form a link trunk for end station 512. Both link trunks correspond to a virtual RBridge 508. End station 514 is a stand-alone end station coupled to RBridge 506. Among the links in a link trunk, one link is selected to be a primary link. For example, link 509 is the primary link for end station 513's link trunk, and link 505 is the primary link for end station 512's link trunk. The different multicast scenarios and the corresponding RBridge forwarding behaviors are described below.

When an egress RBridge, say RBridge 504, receives a multicast frame from the TRILL network destined to end station 512, it first determines whether the ingress RBridge nickname is the same as a virtual RBridge nickname with which it is associated. For example, RBridge 504 would determine whether the frame's ingress RBridge nickname is virtual RBridge 508's nickname. If so, the frame is discarded. Otherwise, RBridge 504 further determines whether its link to end station 512 is the primary link. In this case, since link 505 is the primary link for the link trunk to end station 512, RBridge 504 can forward the multicast frame to end station 512. If link 505 is not the primary link, the frame is discarded.

When an ingress RBridge, say RBridge 506, receives a multicast frame from stand-alone end station 514, wherein end station 513 and/or end station 512 are in the multicast group, RBridge 506 is required to forward the frame to end station 513 and/or end station 512. In other words, if a local dual-homed end station is in the multicast group of a multicast frame received locally from a stand-alone end station, the multicast frame is forwarded by the local RBridge, regardless of whether the link between the local RBridge and the dual-homed end station is a primary link. Note that the frame would also be forwarded to the rest of the TRILL network if additional end stations are in the multicast group. The multicast frame will eventually reach RBridge 504, which is the other partner node corresponding to virtual RBridge 508. However, since RBridge 504 is precluded from forwarding the multicast frame to end stations 513 and/or end station 512 (because the frame has virtual RBridge 508's nickname as its ingress RBridge nickname), traffic duplication can be avoided.

Similarly, if end station 513 generates a multicast frame which is sent to RBridge 506, and end station 512 is in the multicast group, RBridge 506 would forward this frame directly to end station 512, although link 503 is not the primary link in the link trunk to end station 512.

Figure 5B:
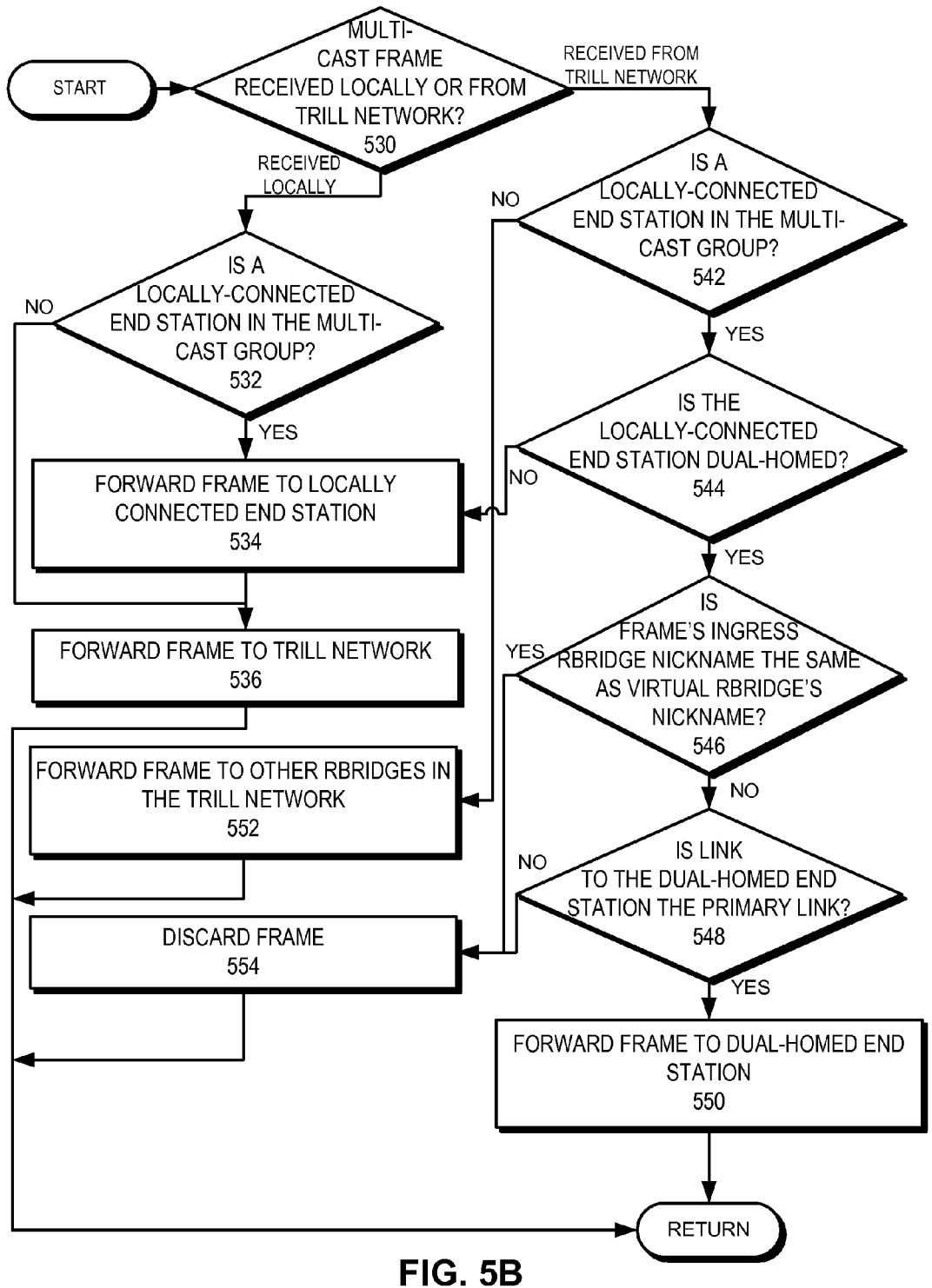
FIG. 5B presents a flowchart illustrating the process of forwarding a multicast frame, in accordance with an embodiment of the present invention.

FIG. 5B presents a flowchart illustrating the process of forwarding a multicast frame, in accordance with an embodiment of the present invention. During operation, after receiving a multicast frame at a local physical RBridge, the RBridge first determines whether the multicast frame is received locally (i.e., from an end station coupled to the RBridge) or from the TRILL network (operation 530). If the frame is received the locally, the RBridge further determines whether a locally-connected end station is in the multicast group (operation 532).

If a locally-connected end station is in the multicast group, the RBridge forwards the frame to the locally connected end station (operation 534). Optionally, the RBridge can further forward the frame to the TRILL network, assuming that there are additional end stations within the multicast group that can be reached via the TRILL network (operation 536).

If the frame is received from the TRILL network (see the right branch of operation 530), the RBridge then determines whether a locally-connected end station is in the multicast group (operation 542). If not, the RBridge forwards the frame to other RBridges in the TRILL network (operation 552). If a locally-connected end station is in the multicast group, the RBridge further determines whether the locally-connected end station is dual-homed (operation 544). If it is not dual-homed, the RBridge forwards the frame to the locally-connected end station (operation 534). If it is dual-homed, the RBridge then determines whether the frame's ingress RBridge nickname is the same as the virtual RBridge's nickname associated with the dual-homed end station (operation 546). If they are the same, the frame is discarded (operation 554). Otherwise, the RBridge further determines whether its link to the dual-homed end station is the primary link (operation 548). If the link is the primary link, the RBridge forwards the frame to the dual-homed end station via the link (operation 550). Otherwise, the frame is discarded (operation 554).

Failure Handling

Figure 6:
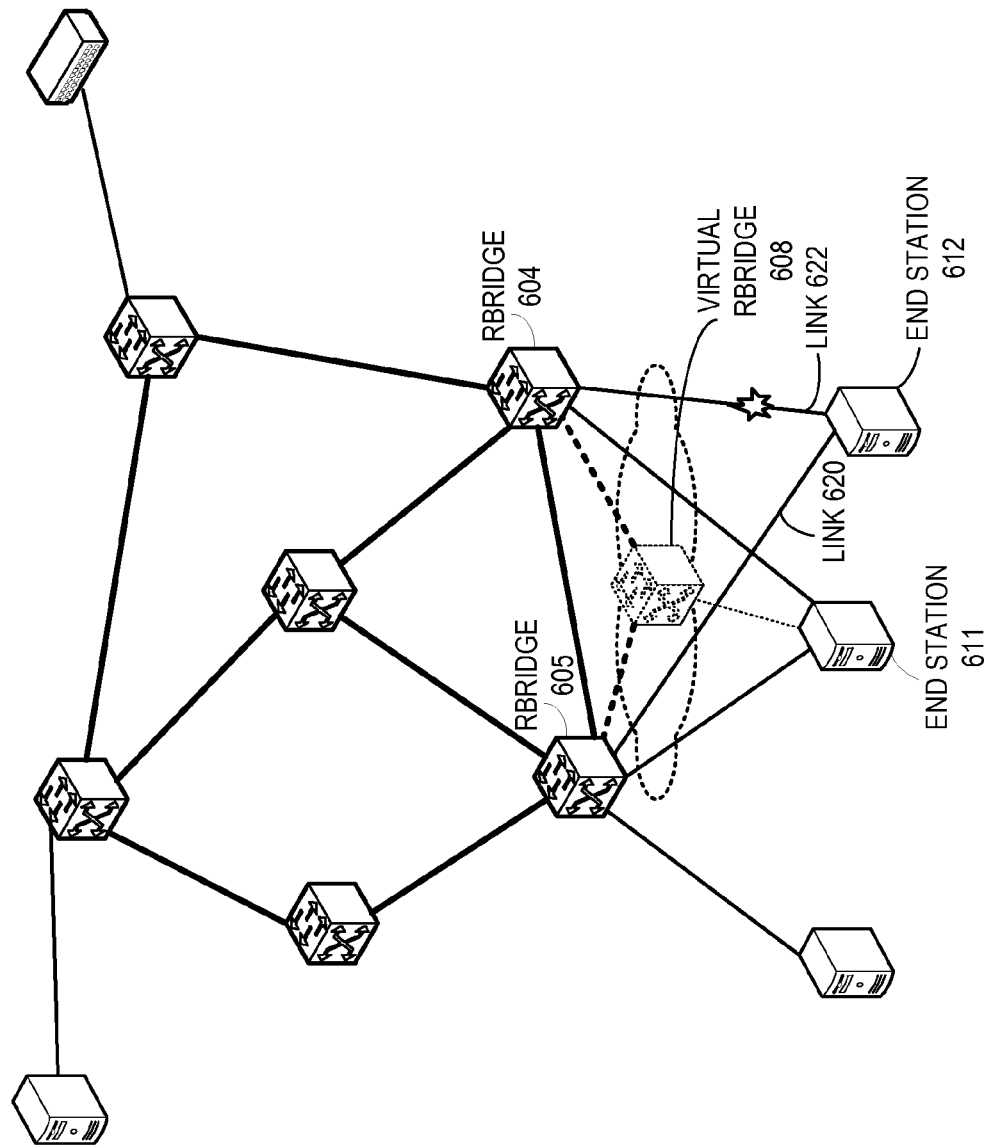
FIG. 6 illustrates a scenario where one of the physical links of a dual-homed end station experiences a failure, in accordance with an embodiment of the present invention.

FIG. 6 illustrates a scenario in which one of the physical links of a dual-homed end station experiences a failure, in accordance with an embodiment of the present invention. In this example, assume that end stations 611 and 612 are both dual-homed with RBridges 605 and 604, via their respective aggregate links. In particular, end station 612 is coupled to RBridge 605 via link 620, and coupled to RBridge 604 via link 622. RBridges 605 and 604 form a virtual RBridge 608. Suppose that link 622 fails during operation. RBridge 604 can detect this failure and notify RBridge 605.

As a result, RBridge 605 discontinues marking frames coming from end station 612 with the nickname of virtual RBridge 608. Instead, the source RBridge nickname for the frames from end station 612 are marked with RBridge 605's nickname. In other words, since end station 612 no longer has the aggregate link to both RBridges 605 and 604, virtual RBridge 608 no longer exists for end station 612. After the TRILL-encapsulated frames from end station 612 reach other egress RBridges in the network, these RBridges will learn that the MAC address corresponding to end station 612 is associated with RBridge 605, instead of virtual RBridge 608. Consequently, future frames destined to end station 612 will be sent to RBridge 605. Note that, during the topology convergence process, RBridge 604 may continue to receive frames destined to end station 612. RBridge 604 can flood these frames to all the ports (except the ports from which the frames are received), or optionally forward these frames to RBridge 605 so there is minimal data loss.

Figure 7:
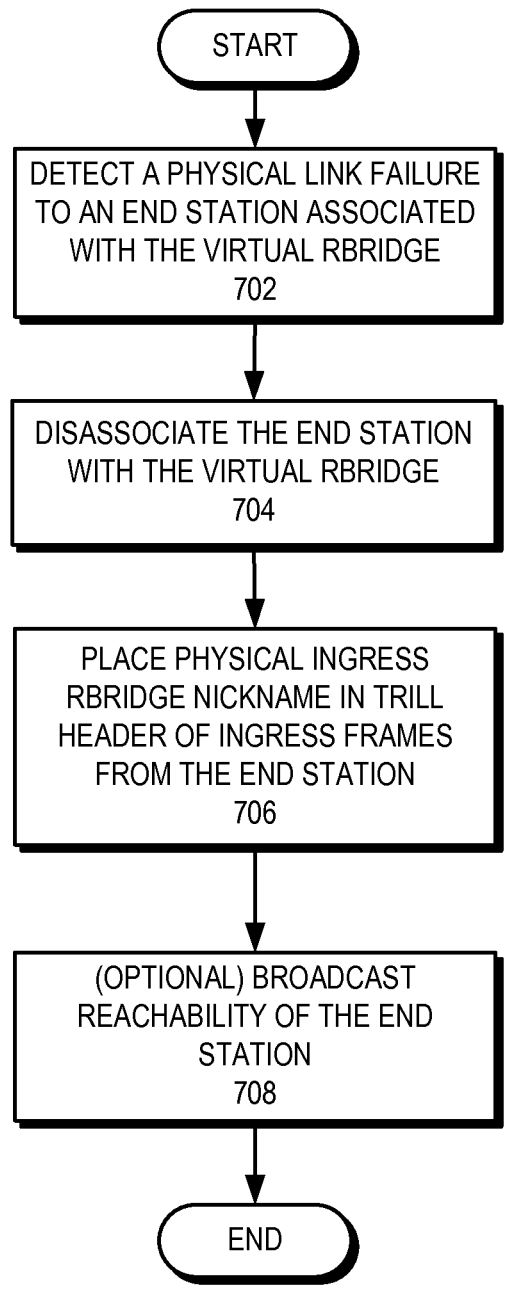
FIG. 7 presents a flowchart illustrating the process of handling a link failure that affects an end station associated with a virtual RBridge, in accordance with an embodiment of the present invention.

FIG. 7 presents a flowchart illustrating the process of handling a link failure that affects an end station associated with a virtual RBridge, in accordance with an embodiment of the present invention. During operation, a partner RBridge detects a physical link failure to an end station associated with the virtual RBridge (operation 702). The RBridge then disassociates the end station with the virtual RBridge (operation 704), and returns to the normal forwarding and/or flooding operation as for non-trunked ports. Furthermore, the RBridge places its own nickname (i.e., the physical ingress RBridge's nickname) in the source RBridge field in the TRILL header of ingress frames from the end station (operation 706). Optionally, the RBridge can broadcast the MAC reachability of the end station via its own RBridge identifier to other RBridges in the TRILL network (operation 708).

Multi-Pathing

Embodiments of the present invention can also facilitate equal-cost or nearly-equal-cost multi-pathing. Take the network topology in FIG. 1 for example. Assume that end station 111 is in communication with end station 114. The shortest path traverses RBridge 104 and RBridge 103. As a result, traffic from end station 114 to end station 111 (which is destined to virtual RBridge 108) would always go through RBridge 104, instead of being split between RBridge 105 and RBridge 104.

In one embodiment, if traffic splitting is desired, the partner RBridges can advertise to the rest of the TRILL network that virtual RBridge 108 is equal to RBridge 104 and RBridge 105, e.g., via a message indicating $RB_x \rightarrow \{RB_1, RB_2\}$, where $RB_x$ denotes the virtual RBridge nickname, and $RB_1$ and $RB_2$ denote the physical RBridge nicknames. This can be done using control messages supported by existing routing protocols, such as the IS-IS protocol. As a result, for a given set of data flows, RBridge 103 can select RBridge 104 as the egress RBridge, whereas for other flows RBridge 103 can select RBridge 105 as the egress RBridge.

Exemplary Switch System

Figure 8:
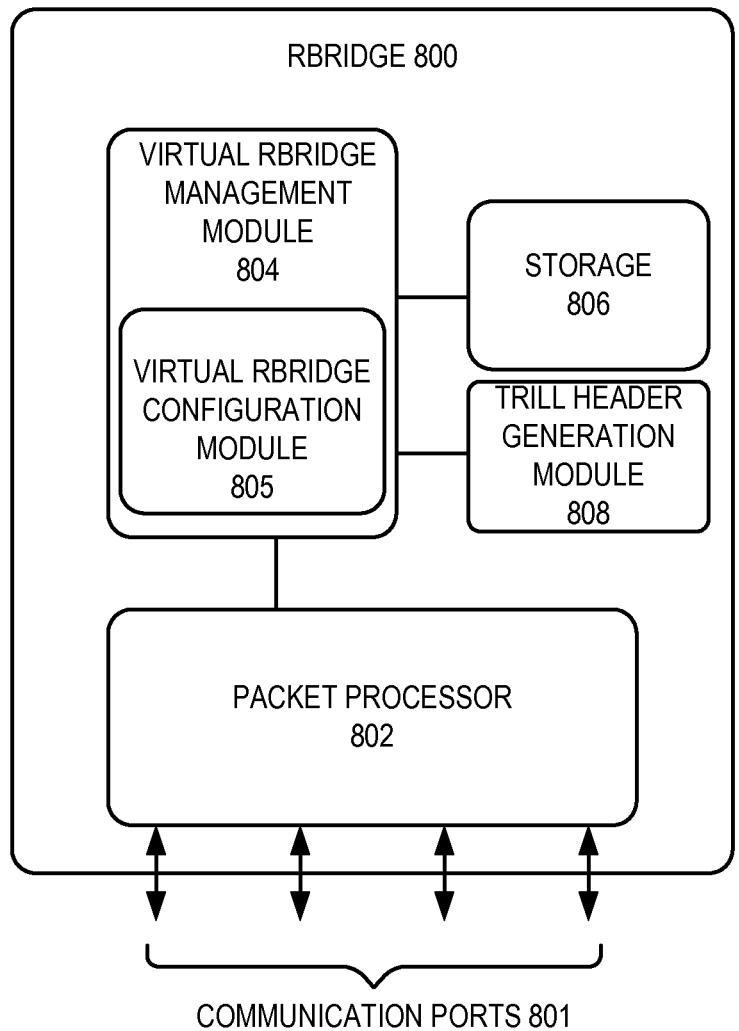
FIG. 8 illustrates an exemplary architecture of a switch that facilitates assignment of a virtual RBridge ID, in accordance with an embodiment of the present invention.

FIG. 8 illustrates an exemplary architecture of a switch that facilitates assignment of a virtual RBridge ID, in accordance with an embodiment of the present invention. In this example, an RBridge 800 includes a number of communication ports 801, a packet processor 802, a virtual RBridge management module 804, a virtual RBridge configuration module 805, a storage device 806, and a TRILL header generation module 808. During operation, communication ports 801 receive frames from (and transmit frames to) the end stations. Packet processor 802 extracts and processes the header information from the received frames. Packet processor 802 further performs routing on the received frames based on their Ethernet headers, as described in conjunction with FIG. 2. Note that communication ports 801 include at least one inter-switch communication channel for communication with one or more partner RBridges. This inter-switch communication channel can be implemented via a regular communication port and based on any open or proprietary format. Furthermore, the inter-switch communication between partner RBridges is not required to be direct port-to-port communication. Virtual RBridge management module 804 manages the communication with the partner RBridges and handles various inter-switch communication, such as MAC address information sharing and link failure notification.

Virtual RBridge configuration module 805 allows a user to configure and assign the identifier for the virtual RBridges. It is also responsible for communicating with the partner RBridge(s) to share each other's MAC address reachability information, which is stored in storage 806. Furthermore, TRILL header generation module 808 generates the TRILL header for ingress frames corresponding to the virtual RBridge. Note that the above-mentioned modules can be implemented in hardware as well as in software. In one embodiment, these modules can be embodied in computer-executable instructions stored in a memory which is coupled to one or more processors in RBridge 800. When executed, these instructions cause the processor(s) to perform the aforementioned functions.

In summary, embodiments of the present invention provide a method and system for facilitating link aggregation across different switches in a routed network. In one embodiment, a virtual RBridge is formed to accommodate an aggregate link from an end station to multiple physical RBridges. The virtual RBridge is used as the ingress RBridge for ingress frames from the end station. Such configuration provides a scalable and flexible solution to link aggregation across multiple switches.

The methods and processes described herein can be embodied as code and/or data, which can be stored in a computer-readable nontransitory storage medium. When a computer system reads and executes the code and/or data stored on the computer-readable nontransitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A first switch, comprising:
   a processing circuitry;
   a memory coupled to the processing circuitry and storing instructions which when executed cause the processing circuitry to:
   form a single logical switch with a second switch, wherein the logical switch is assigned a virtual switch identifier, and wherein the first and the second switches are both allowed to forward frames destined to an end station coupled to the first and second switches via local output ports concurrently, thereby facilitating load balancing; and
   mark an ingress-switch field of a frame received from the end station with the virtual switch identifier.

2. The first switch of claim 1, wherein the first switch is a layer-2 switch capable of routing without requiring the network topology to be based on a spanning tree topology.

3. The first switch of claim 1, wherein the first switch is configured to forward the frame received from the end station in a routed network.

4. The first switch of claim 1, wherein the memory further stores instructions which when executed cause the processing circuitry to set the cost of a link to the logical switch to be zero.

5. The first switch of claim 1, wherein the memory further stores instructions which when executed cause the processing circuitry to identify the virtual switch identifier in an egress-switch field of a second frame for the end station.

6. The first switch of claim 1 wherein the memory further stores instructions which when executed cause the processing circuitry to notify the second switch about the reachability of a media access control (MAC) address associated with the end station.

7. The first switch of claim 1, wherein the memory further stores instructions which when executed cause the processing circuitry to disassociate the end station from the logical switch upon detecting a failure of a link between the end station and the second switch.

8. The first switch of claim 1, wherein upon detecting a failure of a link between the end station and the first switch, the memory further stores instructions which when executed cause the processing circuitry to notify the second switch of the failure via an inter-switch communication channel.

9. The first switch of claim 1, wherein the memory further stores instructions which when executed cause the processing circuitry to advertise that the logical switch is associated with both the first switch and the second switch, thereby facilitating multi-path routing to or from a device coupled to both switches.

10. The first switch of claim 1, wherein the memory further stores instructions which when executed cause the processing circuitry to discard a received multicast frame corresponding to a multicast group to which the end station belongs, when:
    the multicast frame's ingress switch identifier corresponds to the virtual switch identifier; or
    the multicast frame's ingress switch identifier is different from the virtual switch identifier and a link between the end station and the first switch is not a primary link.

11. The first switch of claim 1, wherein the memory further stores instructions which when executed cause the processing circuitry to forward a multicast frame originated from a second end station coupled to the first switch to the end station wherein the end station is in a multicast group corresponding to the multicast frame.

12. A method, comprising:
    forming a single logical switch which includes a first switch and a second switch, the logical switch having a virtual switch identifier, wherein the first and the second switches are both allowed to forward frames destined to an end station coupled to the first and second switches via local output ports concurrently, thereby facilitating load balancing; and
    marking an ingress-switch field of a frame received from the end station with the virtual switch identifier.

13. The method of claim 12, further comprising performing a layer-2 forwarding function without requiring the network topology to be based on a spanning tree topology.

14. The method of claim 12, further comprising forwarding the frame received from the end station in a routed network.

15. The method of claim 12, further comprising advertising to a neighbor a zero-cost link from the first switch to the logical switch.

16. The method of claim 12, further comprising identifying the virtual switch identifier in the header of an egress frame.

17. The method of claim 12, further comprising notifying the second switch about the reachability of a media access control (MAC) address associated with the end station.

18. The method of claim 12, wherein upon detecting a failure of a link between the end station and the second switch, the method further comprises disassociating the end station from the logical switch.

19. The method of claim 12, wherein upon detecting a failure of a link between the end station and the first switch, the method further comprises notifying the second switch of the failure via an inter-switch communication channel.

20. The method of claim 12, further comprising advertising that the logical switch is associated with both the first switch and the second switch, thereby facilitating multi-path routing to or from a device coupled to both switches.

21. The method of claim 12, further comprising discarding a received multicast frame corresponding to a multicast group to which the end station belongs, when:

the multicast frame's ingress switch identifier corresponds to the virtual switch identifier; or the multicast frame's ingress switch identifier is different from the virtual switch identifier and a link between the end station and the first switch is not a primary link.

22. The method of claim 12, further comprising forwarding a multicast frame originated from a second end station coupled to the first switch to the end station, wherein the end station is in a multicast group corresponding to the multicast frame.

23. A first switch means, comprising:

an inter-switch communication means for communicating with a second switch means;

a management means for operating the first switch means in conjunction with the second switch means as a single logical switch which is assigned a virtual switch identifier, wherein the first and the second switch means are both allowed to forward frames destined to an end station means coupled to the first and second switch means via local output ports concurrently, thereby facilitating load balancing; and a frame-marking means for marking an ingress-switch field of a frame received from the end station means with the virtual switch identifier.

* * * * *